US008977140B2

(12) United States Patent
Suzuki

(10) Patent No.: US 8,977,140 B2
(45) Date of Patent: Mar. 10, 2015

(54) OPTICAL RECEIVER AND OPTICAL RECEPTION METHOD

(75) Inventor: Yasuyuki Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 29 days.

(21) Appl. No.: 14/001,614

(22) PCT Filed: Feb. 17, 2012

(86) PCT No.: PCT/JP2012/054485
§ 371 (c)(1),
(2), (4) Date: Aug. 26, 2013

(87) PCT Pub. No.: WO2012/117951
PCT Pub. Date: Sep. 7, 2012

(65) Prior Publication Data
US 2013/0336665 A1 Dec. 19, 2013

(30) Foreign Application Priority Data
Mar. 1, 2011 (JP) ................................. 2011-043742

(51) Int. Cl.
*H04B 10/06* (2006.01)
*H04B 10/61* (2013.01)

(52) U.S. Cl.
CPC ............ *H04B 10/61* (2013.01); *H04B 10/611* (2013.01); *H04B 10/616* (2013.01)
USPC ......................................... 398/208; 398/202

(58) Field of Classification Search
USPC ................................................ 398/202–214
See application file for complete search history.

(56) References Cited

U.S. PATENT DOCUMENTS

| 7,970,290 B2 * | 6/2011 | Tao et al. | 398/202 |
| 8,306,431 B2 | 11/2012 | Takahara | |
| 8,335,438 B2 * | 12/2012 | Kim et al. | 398/154 |
| 8,340,530 B2 * | 12/2012 | Cai | 398/163 |
| 2008/0145066 A1 | 6/2008 | Hoshida | |

(Continued)

FOREIGN PATENT DOCUMENTS

| JP | 05-191351 | 7/1993 |
| JP | 11-205241 | 7/1999 |
| JP | 2008-153863 | 7/2008 |

(Continued)

OTHER PUBLICATIONS

International Search Report, PCT/JP2012/054485, Apr. 10, 2012.

*Primary Examiner* — M R. Sedighian
(74) *Attorney, Agent, or Firm* — Young & Thompson

(57) ABSTRACT

An optical receiver includes: an interference unit generating a first interference light signal (ILS1) and a second interference light signal (ILS2) with an approximately inverse phase to that of the first interference light signal, by causing a received light signal to interfere with local oscillator light; a first interference light subtraction unit generating a first interference light subtraction signal (ILSS1) representing the difference between signals obtained by photoelectric conversion of ILS1 and a local oscillator light proportional signal having light intensity based on the light intensity of the local oscillator light; a second interference light subtraction unit generating a second interference light subtraction signal (ILSS2) representing the difference between a signal obtained by photoelectric conversion of ILS2 and the signal obtained by photoelectric conversion of the local oscillator light proportional signal; and a difference output unit outputting a signal representing the difference between ILSS1 and ILSS2.

20 Claims, 10 Drawing Sheets

(56) References Cited

U.S. PATENT DOCUMENTS

| | | |
|---|---|---|
| 2010/0021179 A1* | 1/2010 | Kikuchi .................. 398/183 |
| 2010/0074632 A1* | 3/2010 | Zhou ..................... 398/208 |
| 2010/0260504 A1 | 10/2010 | Takahara |
| 2010/0329697 A1* | 12/2010 | Koizumi et al. ............. 398/208 |

FOREIGN PATENT DOCUMENTS

JP   2010-251851   11/2010

* cited by examiner

OPTICAL RECEIVER AND OPTICAL RECEPTION METHOD

TECHNICAL FIELD

The present invention relates to an optical receiver used in a reception device in an optical communication system, and in particular, to an optical receiver of a coherent optical reception method.

BACKGROUND ART

With widespread use of the internet, increase in the capacity of an optical communication system has been advanced. For example, for a trunk line system, researches are conducted on an optical transmitter and an optical receiver which can transmit signals beyond 40 Gbit/s per wavelength. With increasing the bit rate per wavelength, also increased is degradation in signal quality due to degradation in tolerance of optical signal to noise ratio (OSNR) and due to waveform distortion caused by wavelength dispersion, polarization mode dispersion and a nonlinear effect of a transmission line. Accordingly, a digital coherent reception method which has a high OSNR tolerance and a high waveform distortion tolerance has attracted attention in recent years.

In the digital coherent reception method, light intensity information and phase information are extracted from a received light signal, and demodulation is performed by a digital signal processing circuit. Accordingly, in the digital coherent reception method, improvement of OSNR tolerance by coherent reception and waveform distortion compensation by the digital signal processing circuit are realized. As a result, by the use of the digital coherent reception method, high reliability can be achieved even in an optical communication system beyond 40 G bit/s.

FIG. 8 shows an example of a configuration of a reception device 9 generally used in the digital coherent reception method and an example of a configuration of an optical receiver 90 provided in the reception device 9. The optical receiver 90 causes a received light signal to interfere with a local oscillator light having almost the same wavelength as that of the received light signal, and converts the interference signal to an electrical signal (coherent detection). Because coherent detection has strong polarization dependence, one optical receiver 90 can receive only an optical signal with the same polarization state as that of the local oscillator light. For this reason, the reception device 9 has a polarization separation circuit in an inputting part for a received light signal, and thereby separates the received light signal into two orthogonal polarization components. Accordingly, to detect one light signal, the reception device 9 requires two optical receivers 90. However, the disadvantage can be compensated by polarization multiplexing the light signal at the sending side and thereby doubling the information transmission amount.

In FIG. 8, in each of the optical receivers 90 provided for detecting the respective polarizations, a received light signal and local oscillator light are inputted to an optical 90 degree hybrid 91. The optical 90 degree hybrid 91 outputs a total of four output light beams which includes a pair of output light beams (I) generated by causing the received light signal interfere with the local oscillator light in in-phase and counter-phase conditions and another pair of output light beams (Q) generated by the interference in quadrature (90 degrees) and counter-quadrature (−90 degrees) conditions. Each of the two pairs of optical signals outputted from the respective optical 90 degree hybrids 91 is converted into a pair of electric current signals by two photodetectors (PDs) 92. Then, on the basis of these current signals, difference output units 93 output signals to be processed by a digital signal processor (DSP) 95 arranged at a following stage. Here, the difference output units 93 are configured by, for example, a differential type transimpedance amplifier. In this case, each of the difference output units 93 efficiently extracts only a beat component between the received light signal and the local oscillator light by canceling out unnecessary direct-current components in the current signals from two PDs 92. An electrical signal outputted from each of the difference output units 93 represent an in-phase interference component (I) or a quadrature interference component (Q) between the received light signal and the local oscillator light.

A total of four electrical signals thus outputted from the optical receivers 90 including I-Q components for X-polarization (XI, XQ) and for Y-polarization (YI, YQ) are AD (analog to digital)-converted into digital information signals at a high speed by analog to digital converters (ADCs) 94. Then, on the digital information signals thus obtained, the DSP 95 performs various equalization/determination processes by the use of digital signal processing widely used in wireless communication. Then, after performing error correction on the signals having undergone the equalization/determination processes, the DSP 95 outputs an information signal of 100 G bit/s. Such a reception device and an optical receiver of the digital coherent receiving method are also described in Patent Document 1.

CITATION LIST

Patent Document

[Patent Document 1] Japanese Patent Application Laid-Open No. 2010-251851

DISCLOSURE OF INVENTION

Technical Problem

Output signals from such an optical receiver as described above are required to have large output amplitude. The reason is that high accuracy and high resolution of the AD converter is obtained at the time of performing the AD conversion and the subsequent digital signal processing at a following stage.

Further, the optical receiver is required to output signals in which high linearity with respect to received light signal is maintained. It is because, if the linearity is degraded in output signals from the optical receiver, advanced waveform distortion equalization becomes impossible in the digital processing at a following stage. Thus, to input the received light signal to the AD converter without changing its light waveform, the optical receiver is required to have high linearity.

To maintain high linearity of the optical receiver, it is necessary to set the input dynamic range of the difference output unit 93 (differential transimpedance amplifier) in FIG. 8 to be equal to or larger than the input signal intensity. Here, a relationship between optical power of received light signal and that of local oscillator light defined by the standard committee of OIF (Optical Internetworking Forum) is shown in FIG. 9. Referring to FIG. 9, it is noticed that the optical power of local oscillator light is ten or more times larger than that of received light signal. Accordingly, in the above-mentioned optical receiver, owing particularly to the local oscillator light intensity, the intensity of signals inputted to the difference output unit 93 becomes large. As a result, a large input dynamic range is indispensable for the difference output unit 93.

For example, output current signals from two PDs 92 in FIG. 8 for a case the intensity of received light signal is −12 dBm and that of local oscillator light is 12 dBm is shown in FIG. 10. In FIG. 10, a waveform expressed by a solid line and that by a broken line represent output current signals from two PDs 92 inputted to one difference output units 93 in FIG. 8. Referring to FIG. 10, the waveforms of the output current signals from the two PDs each have an offset component (that is, DC component) as large as 1.8 mA, while the amplitude of their variation is only 0.4 mApp. To maintain high linearity even in a case of inputting such a kind of current signal, the difference output units are required to have a large input dynamic range.

The present invention has been made to solve the above-described problem, and accordingly, its objective is to provide an optical receiver making it possible to reduce the input dynamic range needed for a circuit configuring the optical receiver while outputting a signal in which high linearity with respect to a received light signal is maintained.

Solution to Problem

An optical receiver of the present invention comprises: an interference unit which generates a first interference light signal and a second interference light signal with an approximately inverse phase to that of the first interference light signal, by causing a received light signal to interfere with local oscillator light; a first interference light subtraction unit which generates a first interference light subtraction signal representing the difference between a signal obtained by photoelectric conversion of the first interference light signal and a signal obtained by photoelectric conversion of a local oscillator light proportional signal having a light intensity based on the light intensity of the local oscillator light; a second interference light subtraction unit which generates a second interference light subtraction signal representing the difference between a signal obtained by photoelectric conversion of the second interference light signal and the signal obtained by photoelectric conversion of the local oscillator light proportional signal; and a difference output unit which outputs a signal representing the difference between the first and the second interference light subtraction signals.

An optical reception method of the present invention comprises: generating a first interference light signal and a second interference light signal with an approximately inverse phase to that of the first interference light signal, by causing a received light signal to interfere with local oscillator light; generating a first interference light subtraction signal representing the difference between a signal obtained by photoelectric conversion of the first interference light signal and a signal obtained by photoelectric conversion of a local oscillator light proportional signal having a light intensity based on the light intensity of the local oscillator light; generating a second interference light subtraction signal representing the difference between a signal obtained by photoelectric conversion of the second interference light signal and the signal obtained by photoelectric conversion of the local oscillator light proportional signal; and outputting a signal representing the difference between the first and the second interference light subtraction signals.

Further, an optical receiver of the present invention comprises: an interference unit which generates a first interference light signal and a second interference light signal with an approximately inverse phase to that of the first interference light signal, by causing a received light signal to interfere with local oscillator light; a first interference light subtraction unit which generates a first interference light subtraction signal representing the difference between a signal obtained by photoelectric conversion of the first interference light signal and an electric current signal having an intensity based on the light intensity of the local oscillator light; a second interference light subtraction unit which generates a second interference light subtraction signal representing the difference between a signal obtained by photoelectric conversion of the second interference light signal and the electric current signal having an intensity based on the light intensity of the local oscillator light; and a difference output unit which outputs a signal representing the difference between the first and the second interference light subtraction signals.

Further, an optical reception method of the present invention comprises: generating a first interference light signal and a second interference light signal with an approximately inverse phase to that of the first interference light signal, by causing a received light signal to interfere with local oscillator light; generating a first interference light subtraction signal representing the difference between a signal obtained by photoelectric conversion of the first interference light signal and an electric current signal having an intensity based on the light intensity of the local oscillator light; generating a second interference light subtraction signal representing the difference between a signal obtained by photoelectric conversion of the second interference light signal and the electric current signal having the intensity based on the light intensity of the local oscillator light; and outputting a signal representing the difference between the first and the second interference light subtraction signals.

Advantageous Effects of Invention

The present invention can provide an optical receiver possible to reduce the input dynamic range needed for a circuit configuring the optical receiver, while outputting a signal in which high linearity with respect to a received light signal is maintained.

DESCRIPTION OF EMBODIMENTS

Hereinafter, exemplary embodiments of the present invention will be described in detail with reference to drawings.

(First Exemplary Embodiment)

Figure 1:
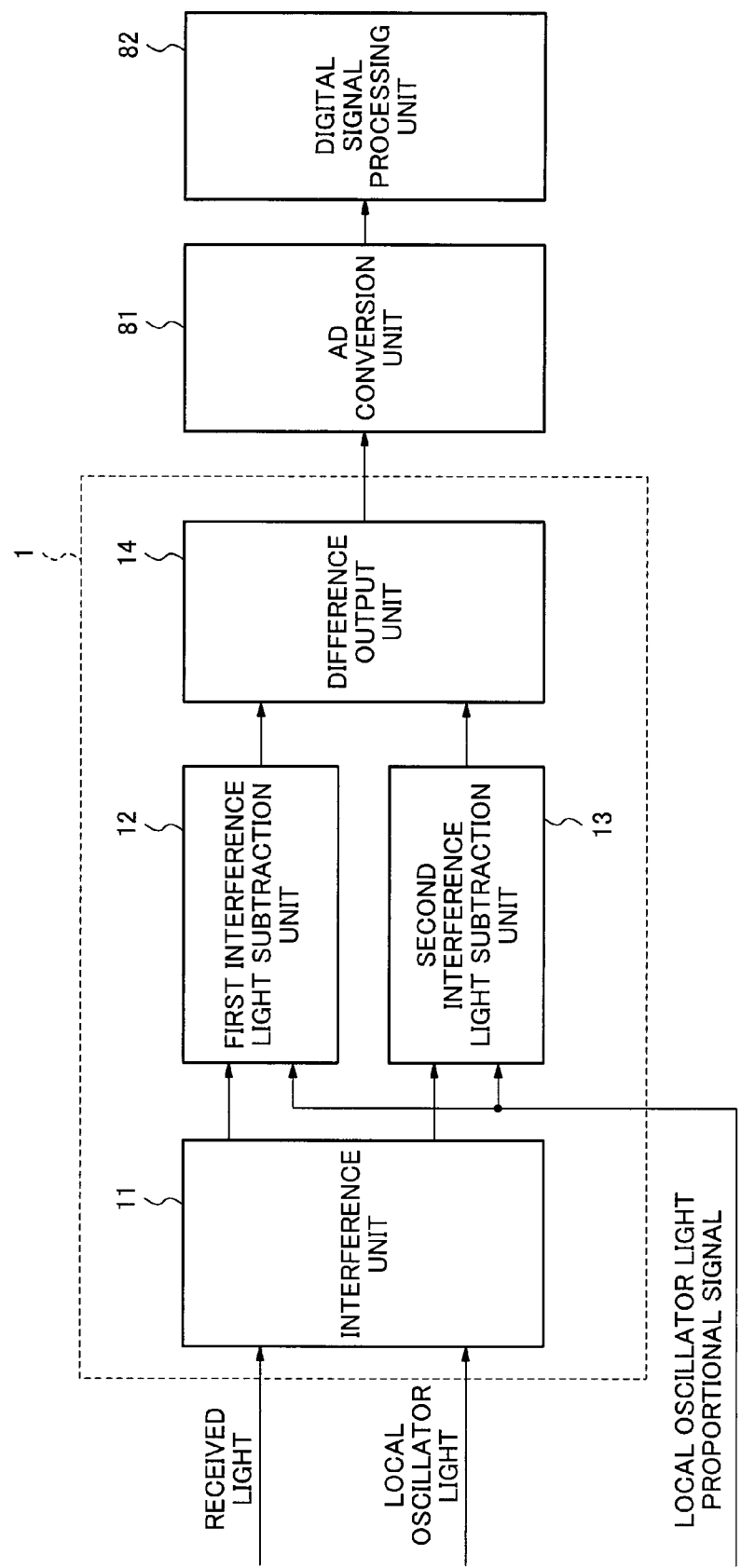
FIG. 1 A block diagram showing a configuration of an optical receiver as a first exemplary embodiment of the present invention FIG. 2 A block diagram showing a configuration of an optical receiver as a second exemplary embodiment of the present invention FIG. 3 A diagram showing an example of a circuit configuration of the optical receiver as the second exemplary embodiment of the present invention FIG. 4 A block diagram showing a configuration of an optical receiver as a third exemplary embodiment of the present invention FIG. 5 A diagram showing an example of a circuit configuration of the optical receiver as the third exemplary embodiment of the present invention FIG. 6 A graph for explaining an offset component of an output current signal from a balanced-type photodetector in the third exemplary embodiment of the present invention FIG. 7 A diagram showing another example of a circuit configuration of the optical receiver as the third exemplary embodiment of the present invention FIG. 8 A diagram showing a configuration of an optical receiver of a related technology FIG. 9 A graph showing a relationship defined between optical power of received light signal and optical power of local oscillator light FIG. 10 A graph for explaining an offset component of an output current signal from a photodetector in the optical receiver of the related technology

FIG. 1 shows a configuration of an optical receiver 1 as a first exemplary embodiment of the present invention. In FIG. 1, the optical receiver 1 includes an interference unit 11, a first interference light subtraction unit 12, a second interference light subtraction unit 13 and a difference output unit 14. Here, the optical receiver 1 is equipped with a reception device using the digital coherent reception method. Electrical signals outputted from the optical receiver 1 are inputted to an AD conversion unit 81 also comprised in the reception device and then processed by a digital signal processing unit 82, and are thereby demodulated to the transmitted data.

By causing a received light signal to interfere with local oscillator light, the interference unit 11 generates a first interference light signal and a second interference light signal whose phase is approximately inverted to that of the first interference light signal. Here, the local oscillator light is a light signal having almost the same wavelength as that of the received light signal. The local oscillator light is outputted from a local oscillator (not illustrated in the diagram) provided in the reception device. The interference unit 11 is configured by, for example, an optical 90 degree hybrid. The interference unit 11 may generate a first and a second interference light signals produced by causing the received light signal to interfere with the local oscillator light in in-phase and counter-phase conditions, respectively. Further, the interference unit 11 may generate a first and a second interference light signals produced by causing the received light signal to interfere with the local oscillator light in quadrature and counter-quadrature conditions, respectively.

The first interference light subtraction unit 12 generates a first interference light subtraction signal representing the difference between a signal obtained by photoelectric conversion of the first interference light signal and a signal obtained by photoelectric conversion of a local oscillator light proportional signal. Here, the local oscillator light proportional signal is a light signal having a light intensity based on the light intensity of the local oscillator light. That is, the light intensity of the local oscillator light proportional signal is proportional to the light intensity of the local oscillator light outputted from the local oscillator. Here, the light intensity of the local oscillator light proportional signal is preferred to be smaller than that of the local oscillator light. The local oscillator light proportional signal may be one inputted from the outside.

For example, the first interference light subtraction unit 12 performs photoelectric conversion of the first interference light signal by the use of a photodetector for converting an optical signal into an electrical signal. Moreover, the first interference light subtraction unit 12 also performs photoelectric conversion of the local oscillator light proportional signal by the use of another photodetector. Then, using a subtracting circuit, the first interference light subtraction unit 12 outputs, as a first interference light subtraction signal, the difference between an electrical signal resulting from the conversion of the first interference light signal and an electrical signal resulting from the conversion of the local oscillator light proportional signal. That is, the first interference light subtraction signal is an electrical signal corresponding to a remainder of subtracting the local oscillator light proportional signal from the first interference light signal.

The second interference light subtraction unit 13 generates a second interference light subtraction signal representing the difference between a signal obtained by photoelectric conversion of the second interference light signal and a signal obtained by photoelectric conversion of the local oscillator light proportional signal mentioned above.

For example, the second interference light subtraction unit 13 performs photoelectric conversion of the second interference light signal by a photodetector The second interference light subtraction unit 13 also performs photoelectric conversion of the local oscillator light proportional signal by another photodetector. Then, using a subtracting circuit, the second interference light subtraction unit 13 outputs, as a second interference light subtraction signal, the difference between an electrical signal resulting from the conversion of the second interference light signal and an electrical signal resulting from the conversion of the local oscillator light proportional signal. That is, the second interference light subtraction signal is an electrical signal corresponding to a remainder of subtracting the local oscillator light proportional signal from the second interference light signal.

The difference output unit 14 outputs a signal representing the difference between the first interference light subtraction signal and the second interference light subtraction signal to the outside of the optical receiver 1. The difference output unit 14 is configured by, for example, a subtractor. An electrical signal outputted by such difference output unit 14 like this includes phase information on the received light signal. For example, when the interference unit 11 generates the first and the second interference light signals produced by causing the received light signal to interfere with the local oscillator light in in-phase and counter-phase conditions, respectively, the signal outputted by the difference output unit 14 is the in-phase interference component between the received light signal and the local oscillator light. When the interference unit 11 generates the first and the second interference light signals which are produced by causing the received light signal to interfere with the local oscillator light in quadrature and counter-quadrature phase conditions, respectively, the signal outputted by the difference output unit 14 is the quadrature-phase interference component between the received light signal and the local oscillator light.

A description will be given below of operation of the optical receiver 1 configured as described above. First, the interference unit 11 generates the first and the second interference light signals, by causing the received light signal to interfere with the local oscillator light in at least two kinds of phases. Next, the first interference light subtraction unit 12 performs photoelectric conversion of the first interference light signal and of the local oscillator light proportional signal, and generates the first interference light subtraction signal obtained as the difference between the two converted signals. The second interference light subtraction unit 13 performs photoelectric conversion of the second interference light signal and of the local oscillator light proportional signal, and generates the second interference light subtraction signal obtained as the difference between the two converted signals. Next, the difference output unit 14 outputs a signal representing the difference between the first and the second interference light subtraction signals to the outside of the optical receiver 1.

The AD conversion unit 81 converts the signal outputted from the optical receiver 1 operating thus into a digital signal and the digital signal processing unit 82 performs various kinds of processing. In this way, the transmitted data is demodulated.

Here, the description has been given of an example where, in the first exemplary embodiment of the present invention, the optical receiver 1 includes only a single one of each of the interference unit 11, first interference light subtraction unit 12, second interference light subtraction unit 13 and difference output unit 14. However, the number of each of the units included in the optical receiver as the present invention is not limited. For example, the optical receiver 1 may include one unit of the interference unit 11 which mixes the received light signal and the local oscillator light by causing the received light signal and the local oscillator light to interfere with each other in in-phase and counter-phase conditions, and also another unit of the interference unit 11 which mixes the received light signal and the local oscillator light by causing the received light signal and the local oscillator light to interfere with each other in quadrature and counter-quadrature phase conditions. In this case, the optical receiver 1 includes the first interference light subtraction unit 12, the second interference light subtraction unit 13 and the difference output unit 14 at stages following each of the interference units 11. According to this configuration, the optical receiver 1 makes it possible to output an in-phase interference component (I) and a quadrature-phase interference component (Q) between the received light signal and the local oscillator light.

The optical receiver 1 thus configured can be employed as an optical receiver for each of two orthogonal polarization components separated from the received light signal in the reception device.

Next, the effect of the first exemplary embodiment of the present invention will be described.

The optical receiver as the first exemplary embodiment of the present invention makes it possible to reduce the input dynamic range needed for a configured circuit while outputting a signal in which high linearity with respect to the received light signal is maintained.

The reason will be described. As already described, the intensity of local oscillator light defined relative to the intensity of received light signal is large. Accordingly, the intensity of the first and the second interference light signals generated by the interference unit is large. In the optical receiver of the related technology described using FIG. 8, the difference output unit outputs the difference between signals obtained by photoelectric conversion of the first and the second interference light signals, respectively. Accordingly, a large input dynamic range is required of the difference output unit to which the electrical signals resulting from the photoelectric conversion of the first and second interference light signals both having a large intensity are inputted.

In contrast, in the optical receiver as the first exemplary embodiment of the present invention, before the electrical signals corresponding to the first and second interference light signals are inputted to the difference output unit, the first and second interference light subtraction units subtract the electrical signal corresponding to the local oscillator light proportional signal from the electrical signals corresponding to the first and the second interference light signals, respectively, and the resulting signals are inputted to the difference output unit. As a result, the optical receiver as the first exemplary embodiment of the present invention can make the amplitude of an offset component of the electrical signals inputted to the difference output unit smaller than that in the related technology. Accordingly, the optical receiver as the first exemplary embodiment of the present invention can reduce the input dynamic range needed for the difference output unit.

Further, in the first exemplary embodiment of the present invention, the light intensity of the local oscillator light proportional signal is proportional to that of the local oscillator light. Accordingly, high linearity can be maintained by the difference output unit which outputs the difference between the first interference light subtraction signal obtained by subtracting the electrical signal corresponding to the local oscillator light proportional signal from the electrical signal corresponding to the first interference light signal and the second interference light subtraction signal obtained by subtracting the electrical signal corresponding to the local oscillator light proportional signal from the electrical signal corresponding to the second interference light signal.

As a result, the optical receiver as the first exemplary embodiment of the present invention makes it possible to reduce the input dynamic range needed for a configured circuit while outputting a signal in which high linearity with respect to the received light signal is maintained.

Additionally, in the first exemplary embodiment of the present invention, it is desirable that the difference output unit is configured by a differential amplifier. The reason will be described. As already described, as well as the high linearity, large output amplitude is also required of the optical receiver. However, in the optical receiver of the related technology described using FIG. 8, it is difficult to reduce the input dynamic range of the difference output unit while maintaining the high linearity and also obtaining an output signal having a large amplitude.

In this respect, it is possible to configure the difference output unit in the first exemplary embodiment of the present invention by a differential amplifier and thereby amplify a signal representing the difference between two electrical signals inputted to the differential amplifier. By this way, in the optical receiver as the first exemplary embodiment of the present invention, it is possible to further reduce the input dynamic range of the differential amplifier while, in an output signal of the differential amplifier, maintaining high linearity and also obtaining a large output amplitude. As an example of the differential amplifier, a differential transimpedance amplifier may be used.

(Second Exemplary Embodiment)

Figure 2:
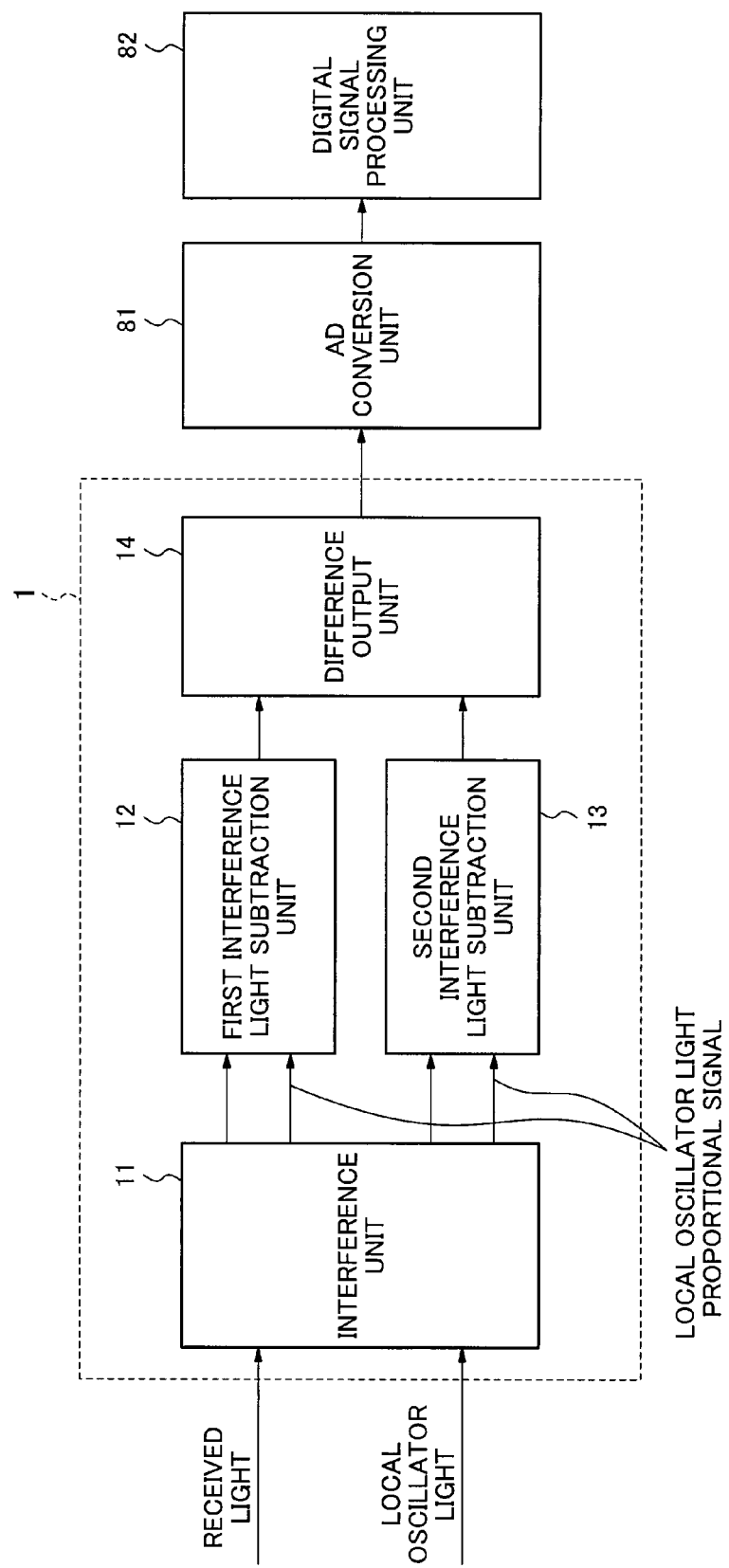

Next, a second exemplary embodiment of the present invention will be described in detail with reference to drawings. Here, in the drawings used for describing the present exemplary embodiment, the same signs are denoted to the same elements as that in the first exemplary embodiment of the present invention, and their detail descriptions are omitted. FIG. 2 shows a configuration of an optical receiver 2 as the second exemplary embodiment of the present invention. In FIG. 2, the optical receiver 2 is different from the optical receiver 1 of the first exemplary embodiment of the present invention in that the optical receiver 1 includes an interference unit 21 in place of the interference unit 11.

The interference unit 21 divides the local oscillator light to generate local oscillator light proportional signals whose intensities are adjusted. The local oscillator light proportional signals generated by the interference unit 21 are outputted to the first interference light subtraction unit 12 and the second interference light subtraction unit 13. For example, the interference unit 21 may output the local oscillator light proportional signals by dividing a signal obtained by phase-shifting the inputted local oscillator light for the purpose of interference between the inputted local oscillator light and the received light signal. In this case, the branched components of the local oscillator light are attenuated by the division and a loss, and are outputted as local oscillator light proportional signals having an intensity lower than and proportional to that of the local oscillator light.

Figure 3:
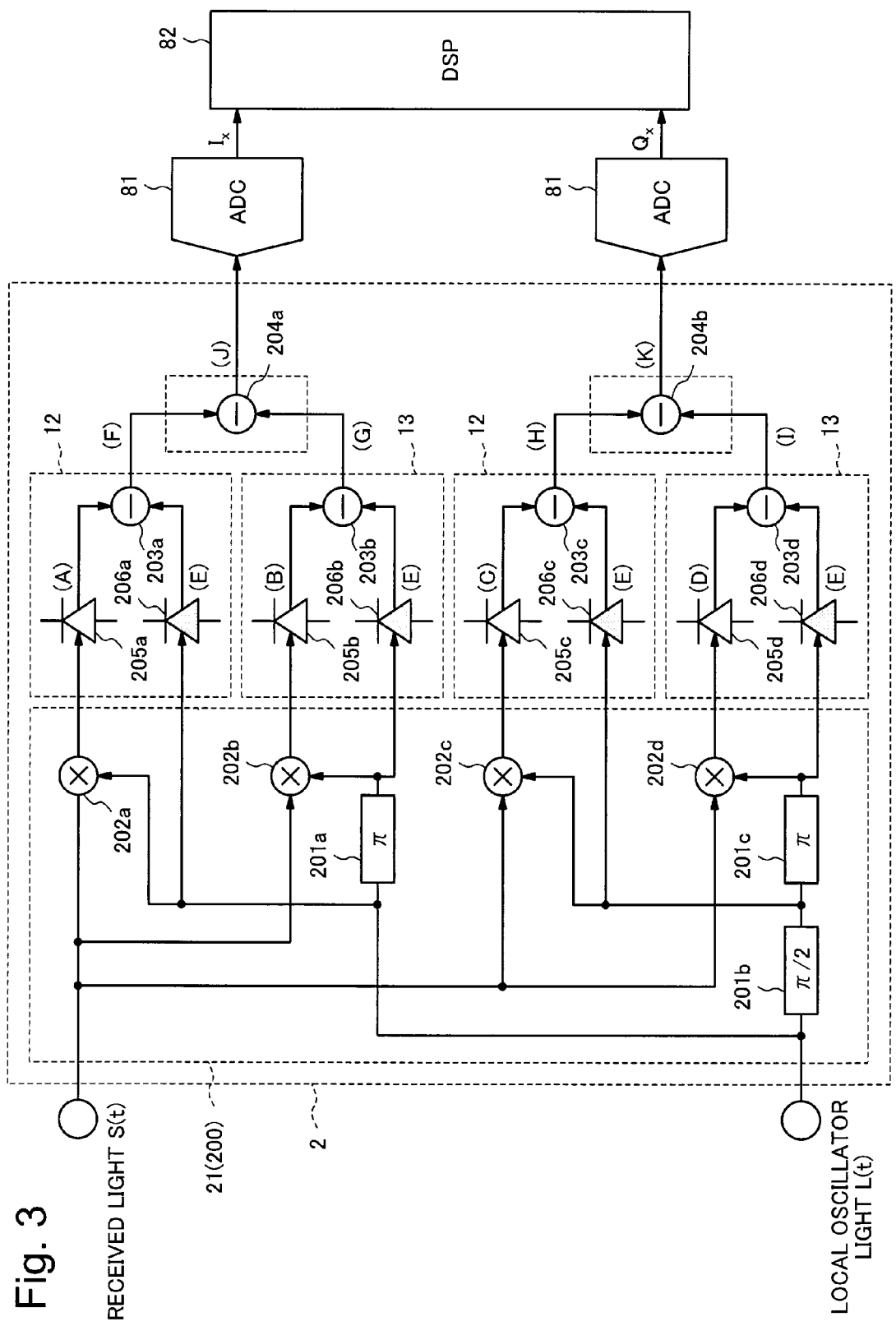

FIG. 3 shows an example of a circuit configuration of an optical receiver, as an optical receiver 2 like this, which is provided in a reception device for receiving a quadrature phase shift keying (QPSK) optical signal. Here, FIG. 3 shows a configuration of a single optical receiver for dealing with one polarization. In FIG. 3, the optical receiver 2 includes an optical 90 degree hybrid 200, photodetectors (PDs) 205a to 205d, PDs 206a to 206d, subtractors 203a to 203d and subtractors 204a and 204b. Additionally, the optical 90 degree hybrid 200 includes optical phase shifters 201a to 201c and optical mixers 202a to 202d. Here, the optical 90 degree hybrid 200 configures one exemplary embodiment of the interference unit in the present invention. The PDs 205a and 206a and the subtractor 203a configure one exemplary embodiment of the first interference light subtraction unit of the present invention. Besides, the PDs 205c and 206c and the subtractor 203c configure one exemplary embodiment of the first interference light subtraction unit of the present invention.

Further, the PDs 205b and 206b and the subtractor 203b configure one exemplary embodiment of the second interference light subtraction unit of the present invention. Besides, the PDs 205d and 206d and the subtractor 203d configure one exemplary embodiment of the second interference light subtraction unit of the present invention. Moreover, each of the subtractors 204a and 204b configures one exemplary embodiment of the difference output unit of the present invention.

Operation of the optical receiver 2 thus configured will be described below.

First, a received light signal S (t) which has been separated into X- or Y-polarization by a polarization beam splitter or the like is inputted to the optical receiver 2. Next, the optical 90 degree hybrid 200 divides the received light signal into four directions by an optical coupler (not shown in the diagram). The optical 90 degree hybrid 200 also divides local oscillator light into four directions by the use of an optical coupler, and shifts the phases of the branched signals by 0, π/2, π and 3π/2 by the optical phase shifters 201a to 201c, respectively. Then, the optical 90 degree hybrid 200 outputs first and second interference light signals obtained by causing the four-branched received light signal to interfere with respective ones of the four-branched and phase-shifted local oscillator light, to the PDs 205a to 205d. Further, the optical 90 degree hybrid 200 outputs local oscillator light proportional signals obtained by further dividing respective ones of the phase-shifted local oscillator light having undergone the phase shifting, to the PDs 206a to 206d. The subtractors 203a to 203d output, to the subtractors 204a or 204b, respective ones of differential signals (F), (G), (H) and (I) representing the difference between respective ones of output signals (A), (B), (C) and (D) from the PDs 205a to 205d and respective ones of output signals (E) from the PDs 206a to 206d. Here, the signals (F) and (H) are the first interference light subtraction signals, and the signals (G) and (I) are the second interference light subtraction signals. Next, the subtractor 204a outputs to an AD conversion unit 81 a differential signal (J) between the output signal (F) from the subtractor 203a and the output signal (G) from the subtractor 203b. Also, the subtractor 204b outputs to another AD conversion unit 81 a differential signal (K) between the output signal (H) from the subtractor 203c and the output signal (I) from the subtractor 203d. With that, the optical receiver 2 completes the operation.

Further, the signals (J) and (K) thus outputted from the optical receiver 2 are converted into digital signals by the AD conversion units 81. The digital signals undergo digital signal processing by the digital signal processing unit 82, such as polarization separation, light source frequency offset compensation and phase compensation, and are subsequently demodulated.

Next, the effect of the second exemplary embodiment of the present invention will be described.

In the optical receiver as the second exemplary embodiment of the present invention, it is possible to reduce the input dynamic range needed for the subtractors configuring the difference output unit while outputting a signal in which high linearity with respect to the received light signal is maintained.

The reason will be described below, referring to the optical receiver with the circuit configuration shown in FIG. 3. First, a received light signal S(t) is expressed by the following equation (1), and local oscillator light L(t) by the following equation (2).

$$A(t)e^{j\omega_1 t + j\phi(t)} \quad (1)$$

$$L(t) = Be^{j\omega t} \quad (2)$$

Here, $\omega_1$ and $\omega$ are optical frequencies (=the speed of light/wavelength) of the received light signal and the local oscillator light, respectively, and $\phi$ is a phase. Additionally, in a phase shift keying method, information to be sent is coded into the phase $\phi$, which takes $0$, $\pi$, $\pi/2$ or $3\pi/2$ in QPSK. Here, it is supposed that the optical frequencies of the received light signal and the local oscillator light are the same ($\omega_1 = \omega$).

In this case, the output signals (A), (B), (C) and (D) of the respective PDs 205a to 205d, to which respective ones of the first and the second interference light signals between the received light signal and the local oscillator light are inputted, are expressed as the following equations (3) to (6), respectively.

Output signal (A):

$$a|S(t)+L(t)|^2 = a\{A(t)^2 + B^2 + 2A(t)B\cos(\phi(t))\} \quad (3)$$

Output signal (B):

$$b|S(t)-L(t)|^2 = b\{A(t)^2 + B^2 - 2A(t)B\cos(\phi(t))\} \quad (4)$$

Output signal (C):

$$c|S(t)+jL(t)|^2 = c\{A(t)^2 - B^2 + 2A(t)B\sin(\phi(t))\} \quad (5)$$

Output signal (D):

$$d|S(t)-jL(t)|^2 = d\{A(t)^2 + B^2 + 2A(t)B\sin(\phi(t))\} \quad (6)$$

In the equations (3) to (6), a, b, c and d represent the quantum efficiencies of the respective PDs, and are supposed to satisfy a=b=c=d=1 here.

On the other hand, the output signal (E) of each of the PDs 206a to 206d to which the respective local oscillator light proportional signals are inputted is expressed by the following equation (7).

$$e|\alpha L(t)|^2 = e\alpha^2 B^2 \quad (7)$$

Here, $\alpha$ is a proportionality constant relating to the local oscillator light proportional signals, which satisfies $0<\alpha<1$. The e is the quantum efficiency of each of the PDs 206a to 206d, and e=1 is supposed here.

Accordingly, the output signals (F), (G), (H) and (I) of the subtractors 203a to 203d are expressed as the following equations (8) to (11).

Output signal (F):

$$|S(t)+L(t)|^2 - |\alpha L(t)|^2 = A(t)^2 + (1-\alpha^2)B^2 + 2A(t)B\cos(\phi(t)) \quad (8)$$

Output signal (G):

$$|S(t)-L(t)|^2 - |\alpha L(t)|^2 = A(t)^2 + (1-\alpha^2)B^2 - 2A(t)B\cos(\phi(t)) \quad (9)$$

Output signal (H):

$$|S(t)+jL(t)|^2-|\alpha L(t)|^2=A(t)^2+(1-\alpha^2)B^2-2A(t)B\sin(\phi(t)) \quad (10)$$

Output signal (I):

$$|S(t)-jL(t)|^2-|\alpha L(t)|^2=A(t)^2+(1-\alpha^2)B^2+2A(t)B\sin(\phi(t)) \quad (11)$$

In the equations (8) to (11), the first and the second terms represent an offset component (DC component), and the third term represents phase information on the received light signal. From these equations, it is noticed that the output signals (F), (G), (H) and (I) have an offset component smaller by the amount $\alpha^2 B^2$ than in the optical receiver of the related technology not using the PDs 206a to 206d. Because the intensity of the local oscillator light $B^2$ is ten or more times larger than the intensity of the received light signal $A^2$, thus being predominant in the equations (8) to (11), an input dynamic range required of the subtractors 204a and 204b is determined by the term concerning $B^2$. Accordingly, in the present exemplary embodiment, it is possible to reduce the input dynamic range required of the subtractors 204a and 204b by the amount $\alpha^2 B^2$ compared to that in the related technology.

Further, the output signals (J) and (K) of the subtractors 204a and 204b are expressed as the following equations (12) and (13), respectively.

Output signal (J):

$$|S(t)+L(t)|^2-|\alpha L(t)|^2-(|S(t)-L(t)|^2-|\alpha L(t)|^2)=4A(t)B\cos(\phi(t)) \quad (12)$$

Output signal (K):

$$|S(t)+jL(t)|^2-|\alpha L(t)|^2-(|S(t)-jL(t)|^2-|\alpha L(t)|^2)=-4A(t)B\sin(\phi(t)) \quad (13)$$

That is, the optical receiver 2 as the second exemplary embodiment of the present invention is configured to be possible to extract phase information, similarly to the optical receiver of the related technology.

As has been described above, in the optical receiver as the second exemplary embodiment of the present invention, the interference unit outputs the local oscillator light proportional signals obtained by attenuating the local oscillator light, and provided are the PDs 206a to 206d to which the local oscillator light proportional signals are inputted. Then, before obtaining the difference between the signals (A) and (B), which are converted respectively from the first and the second interference light signals between the received light signal and the local oscillator light, the signal (E) resulting from conversion of the local oscillator light proportional signals by the PDs 206a to 206d is subtracted from each of the signals (A) and (B). In this way, offset components of the signals inputted to the subtraction units 204a and 204b can be reduced. As a result, it is possible to reduce the input dynamic range required of the subtractors configuring the difference output unit which extracts phase information on the received light signal.

In addition, in the present exemplary embodiment, the interference unit has been described taking the example which outputs the local oscillator light proportional signals obtained by adjusting the intensity of the local oscillator light by the use of the optical 90 degree hybrid having the circuit configuration shown in FIG. 3. The interference unit of the present invention may output the local oscillator light proportional signals by adjusting the intensity of the local oscillator light by a circuit configuration including other branch paths.

(Third Exemplary Embodiment)

Next, a third exemplary embodiment of the present invention will be described in detail with reference to drawings.

Here, in the drawings used for describing the present exemplary embodiment, the same signs are denoted to the same elements as that in the second exemplary embodiment of the present invention, and their detail descriptions are omitted.

Figure 4:
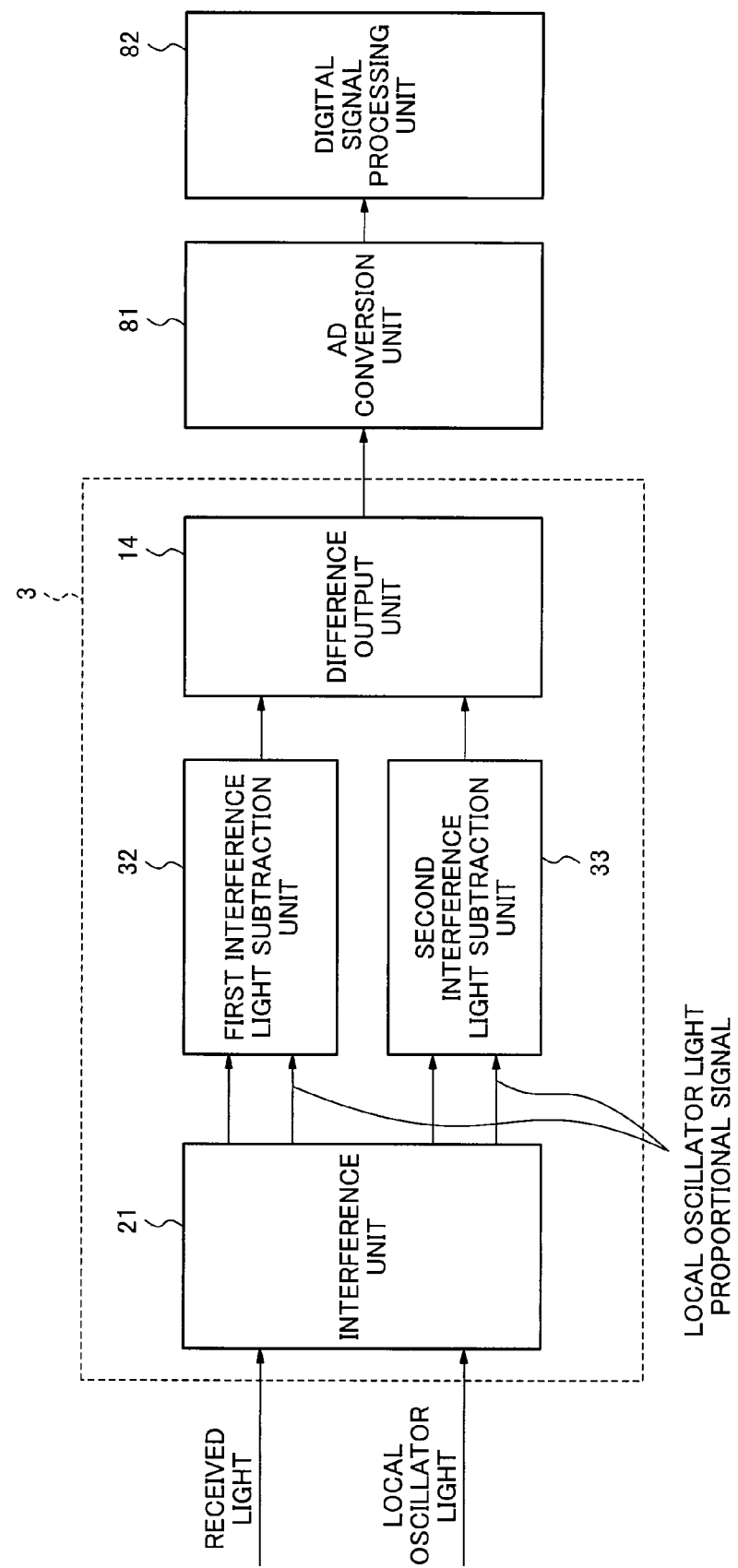

FIG. 4 shows a configuration of an optical receiver 3 as the third exemplary embodiment of the present invention. In FIG. 4, the optical receiver 3 is different from the optical receiver 2 as the second exemplary embodiment of the present invention in that the optical receiver 3 includes a first interference light subtraction unit 32 and a second interference light subtraction unit 33 in place of the first and the second interference light subtraction units 12 and 13, and also includes a difference output unit 34 in place of the difference output unit 14.

The first and the second interference light subtraction units 32 and 33 output signals obtained by subtracting the signals resulting from photoelectric conversion of the local oscillator light proportional signals from the signals resulting from photoelectric conversion of the first and the second interference light signals, by balanced type photodetectors.

The difference output unit 34 amplifies and outputs the difference between the first and the second interference light subtraction signals. The difference output unit 34 is configured by, for example, a differential type transimpedance amplifier.

Figure 5:
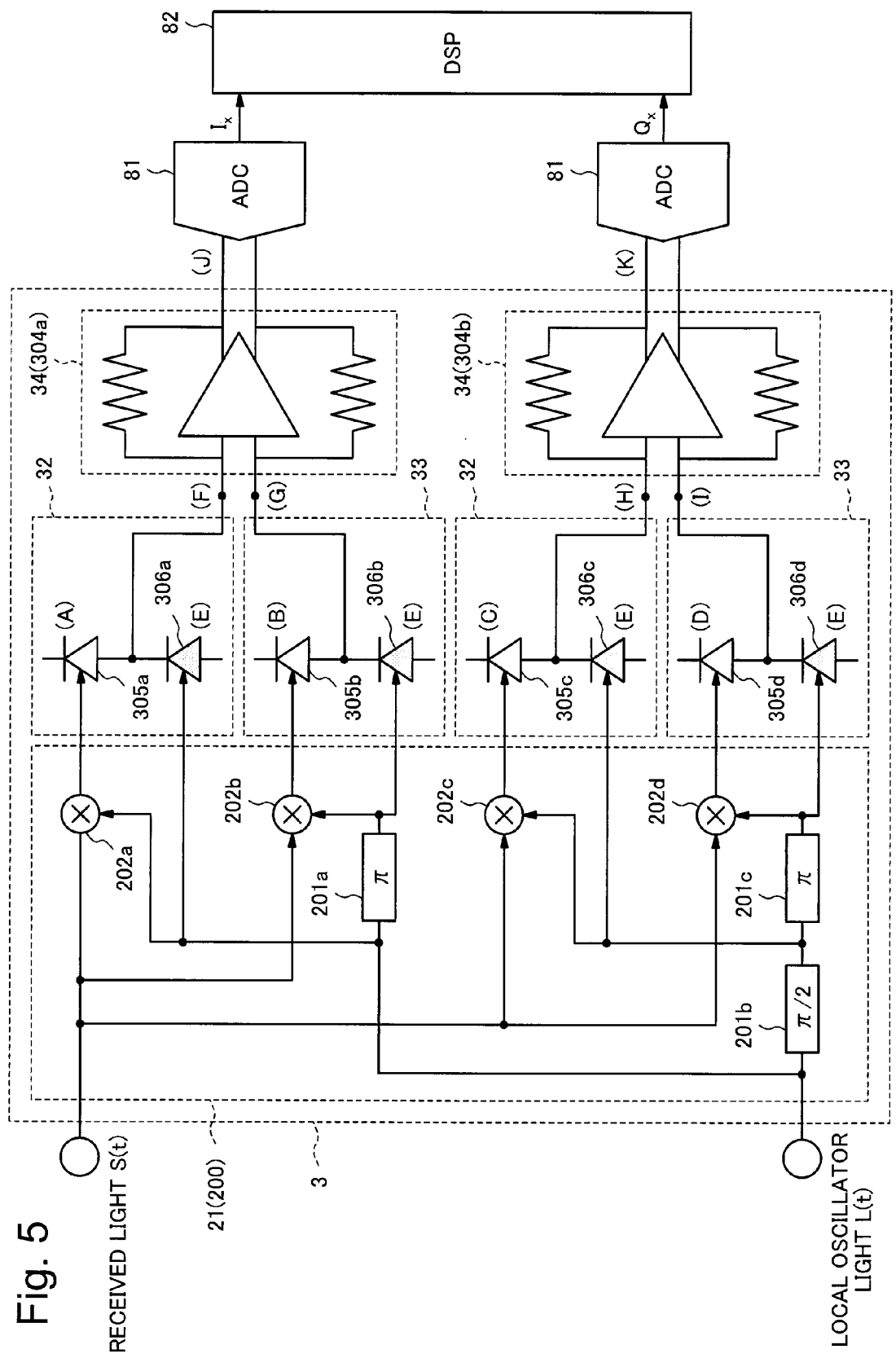

FIG. 5 shows an example of a circuit configuration of an optical receiver, as an optical receiver 3 like this, which is provided in a reception device for receiving a QPSK optical signal. Here, FIG. 5 shows a configuration of a single optical receiver for dealing with one polarization. In FIG. 5, the optical receiver 3 includes the optical 90 degree hybrid 200, PDs 305a to 305d, PDs 306a to 306d and differential type transimpedance amplifiers 304a and 304b. Here, each of PD 305a and 306a, 305b and 306b, 305c and 306c, 305d and 306d configures a balanced type photodetector through connection of the anode of one PD to the cathode of the other. Each of the PD combination of 305a and 306a and that of 305c and 306c configures one exemplary embodiment of the first interference light subtraction unit of the present invention. Also, each of the PD 305b and 306b and PD 305d and 306d configures one exemplary embodiment of the second interference light subtraction unit of the present invention.

Operation of the optical receiver 3 thus configured will be described below.

First, a received light signal S(t) which has been separated into X- or Y-polarization by a polarization beam splitter or the like is inputted to the optical receiver 3. Next, the optical 90 degree hybrid 200 divides the received light signal into four directions by an optical coupler (not shown in the diagram). The optical 90 degree hybrid 200 also divides the local oscillator light into four directions by an optical coupler, and shifts the phases of the branch light beams by 0, $\pi/2$, $\pi$ and $3\pi/2$ by the optical phase shifters 201a to 201c, respectively. Then, the optical 90 degree hybrid 200 outputs, to the PDs 305a to 205d, the first and the second interference light signals obtained by causing the four-branched received light signal to interfere with respective ones of the four-branched local oscillator light having undergone the phase shifting. Further, the optical 90 degree hybrid 200 outputs, to the PDs 306a to 306d, the local oscillator light proportional signals obtained by further dividing respective ones of the four-branched light beams of the local oscillator light having undergone the phase shifting. Next, the balanced type photodetector configured by the PDs 305a and 306a outputs a first interference light subtraction signal (F). Similarly, the balanced type photodetector configured by the PDs 305b and 306b outputs a second interference light subtraction signal (G). Similarly, the balanced type photodetector configured by the PDs 305c and 306c outputs another first interference light subtraction signal (H). Similarly, the balanced type photodetector configured by the PDs 305d and 306d outputs another second interference light subtraction signal (I). Next, the differential type transimpedance amplifier 304a outputs a signal (J) obtained by amplifying the difference between the output signals (F) and (G) to an AD conversion unit 81. Also, the differential type transimpedance amplifier 304b outputs a signal (K) obtained by amplifying the difference between the output signals (H) and (I) to AD conversion unit 81. With that, the optical receiver 3 completes the operation.

Further, the signals (J) and (K) thus outputted from the optical receiver 3 are converted to digital signals by the AD conversion units 81. The digital signals undergo digital signal processing by the digital signal processing unit 82, such as polarization separation, light source frequency offset compensation and phase compensation, and are subsequently demodulated.

Figure 6:
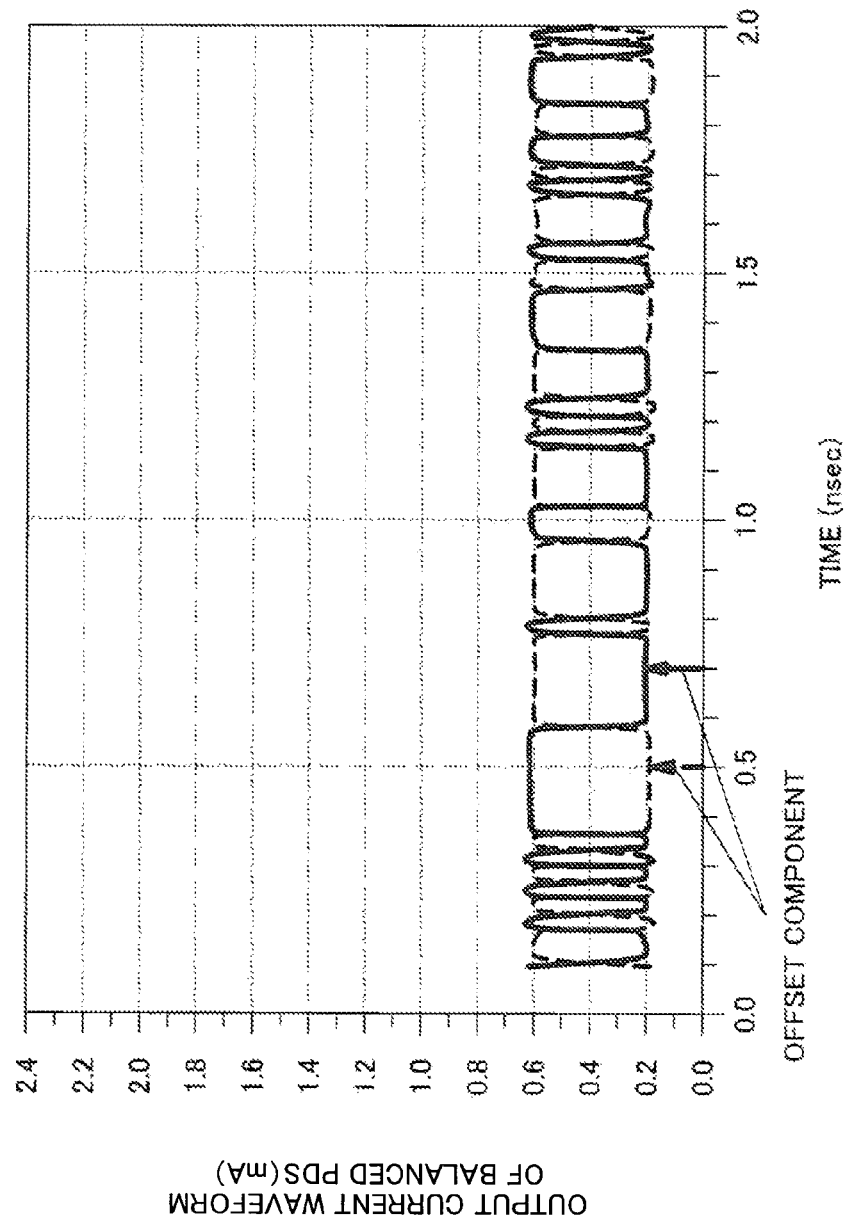

FIG. 6 shows waveforms of the output signals from the balanced type photodetectors (the first and second interference light subtraction signals) to be inputted to the differential type transimpedance amplifiers 304a and 304b, in the optical receiver 3. In FIG. 6, a solid line and a broken line represent respective ones of output current signals from the two balanced type photodetectors inputted to one of the differential type transimpedance amplifiers 304. It is noticed that offset components of these output current signals are smaller than that of the signals inputted to the differential type transimpedance amplifier in the optical receiver of the related technology described in FIG. 10.

Next, the effect of the third exemplary embodiment of the present invention will be described.

The optical receiver as the third exemplary embodiment of the present invention, without necessity of increasing the input dynamic range required of the differential type transimpedance amplifier, can attain larger output amplitude while maintaining the linearity.

The reason will be described below. First, a description will be given of that large output amplitude is required of an optical receiver provided in a reception device of a digital coherent receiving method. It is because an output signal from the optical receiver is AD converted and subsequently undergoes digital signal processing at a following stage. Accordingly, to attain high precision and resolution in the AD conversion unit, large output amplitude from the optical receiver is needed.

Figure 8:
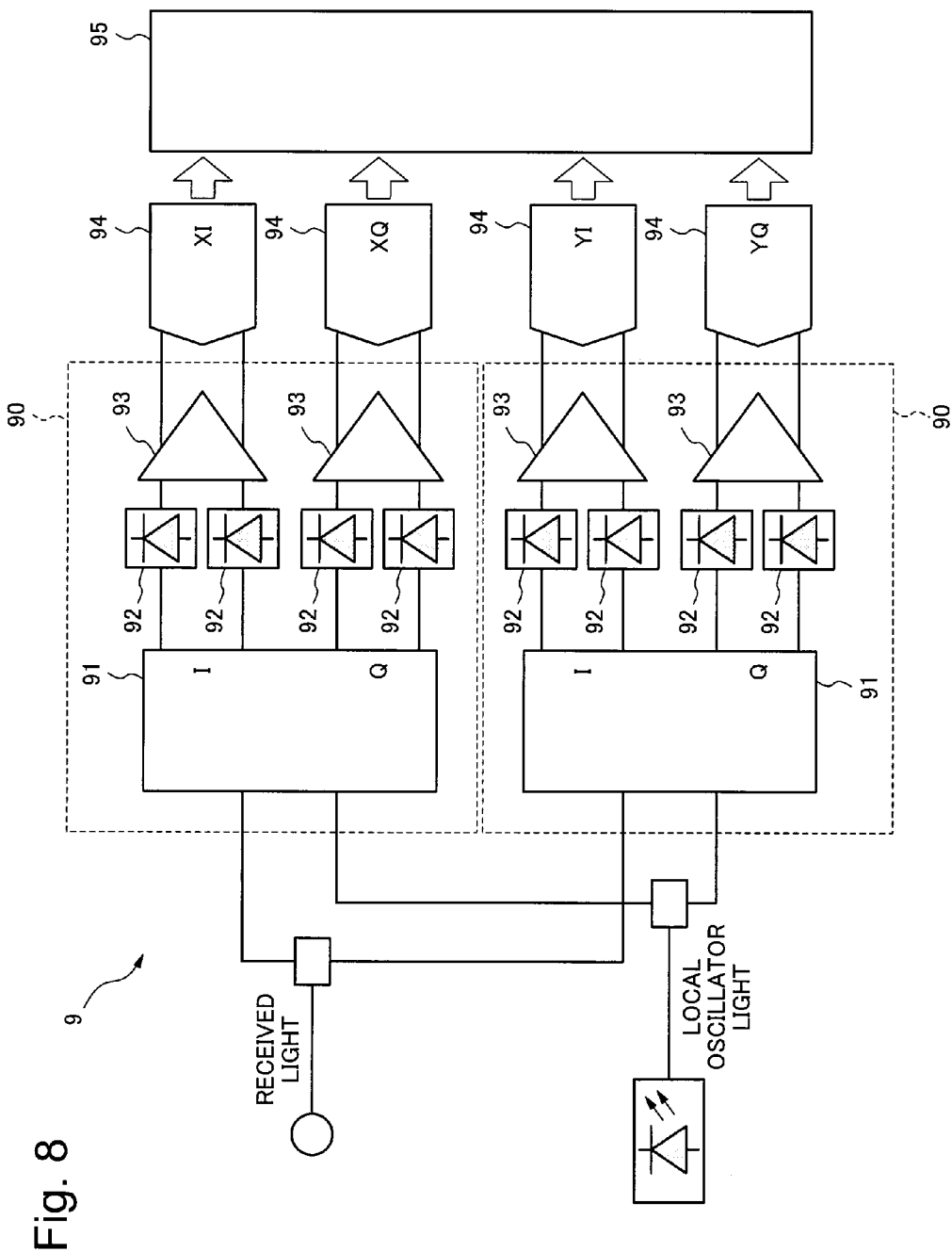
Figure 9:
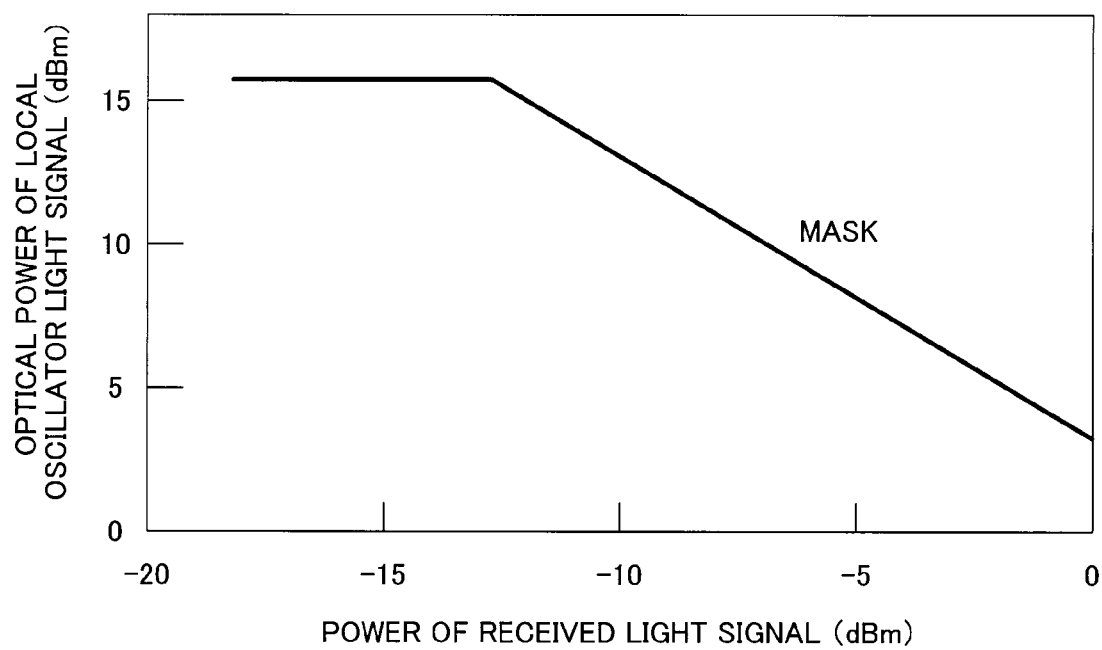
Figure 10:
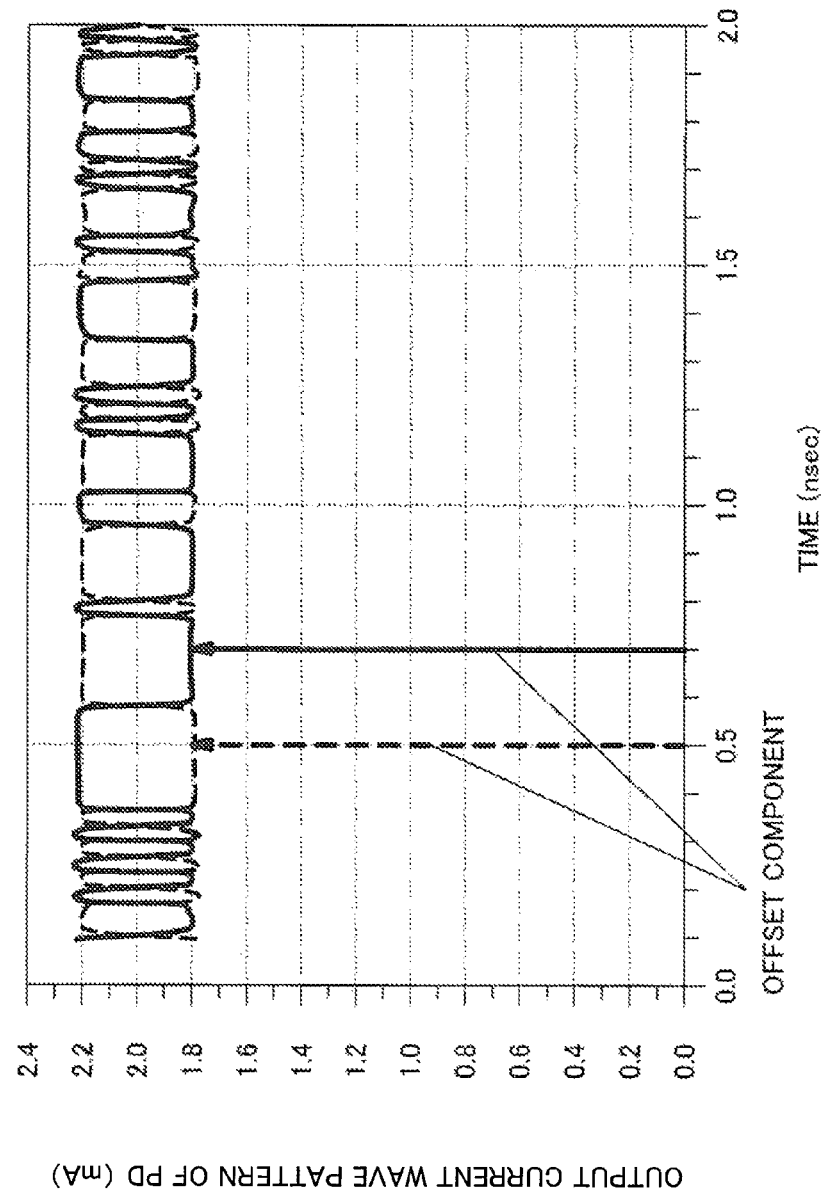

In the optical receiver of the related technology shown in FIG. 8, electrical signals with a large offset component such as shown in FIG. 10 are inputted to the differential type transimpedance amplifier. Accordingly, to attain large output amplitude while maintaining the linearity, it is necessary to set the input dynamic range of the differential type transimpedance amplifier to be large.

In contrast, the optical receiver as the third exemplary embodiment of the present invention subtracts signals obtained by photoelectric conversion of the local oscillator light proportional signals from respective ones of signals obtained by photoelectric conversion of the first and the second interference light signals such as shown in FIG. 10, by the balanced type photodetectors. As a result, the optical receiver as the third exemplary embodiment of the present invention inputs signals with a reduced offset component such as shown in FIG. 6 to the differential type transimpedance amplifier.

Here, the signals (A), (B), (C) and (D) in FIG. 5 which are obtained by photoelectric conversion of the first and the second interference light signals are expressed by the equations (3) to (6), respectively, similarly in the second exemplary embodiment of the present invention. Also similarly to in the second exemplary embodiment of the present invention, the signals (E) in FIG. 5 which are obtained by photoelectric conversion of respective ones of the local oscillator light proportional signals, are expressed by the equation (7). Accordingly, the signals (F), (G), (H) and (I) in FIG. 5 which are inputted to the differential type transimpedance amplifiers as the difference output units are expressed by the equations (8) to (11), respectively, also similarly in the second exemplary embodiment of the present invention, and their offset components are thus reduced by the amount $\alpha^2 B^2$. That is, in the optical receiver as the third exemplary embodiment of the present invention, the input dynamic range required of the differential type transimpedance amplifier can be reduced by the amount $\alpha^2 B^2$.

Additionally, in the optical receiver as the third exemplary embodiment of the present invention, by configuring the first and the second interference light subtraction units by the balanced type photodetectors, the configuration of the optical receiver can be made compact.

Figure 7:
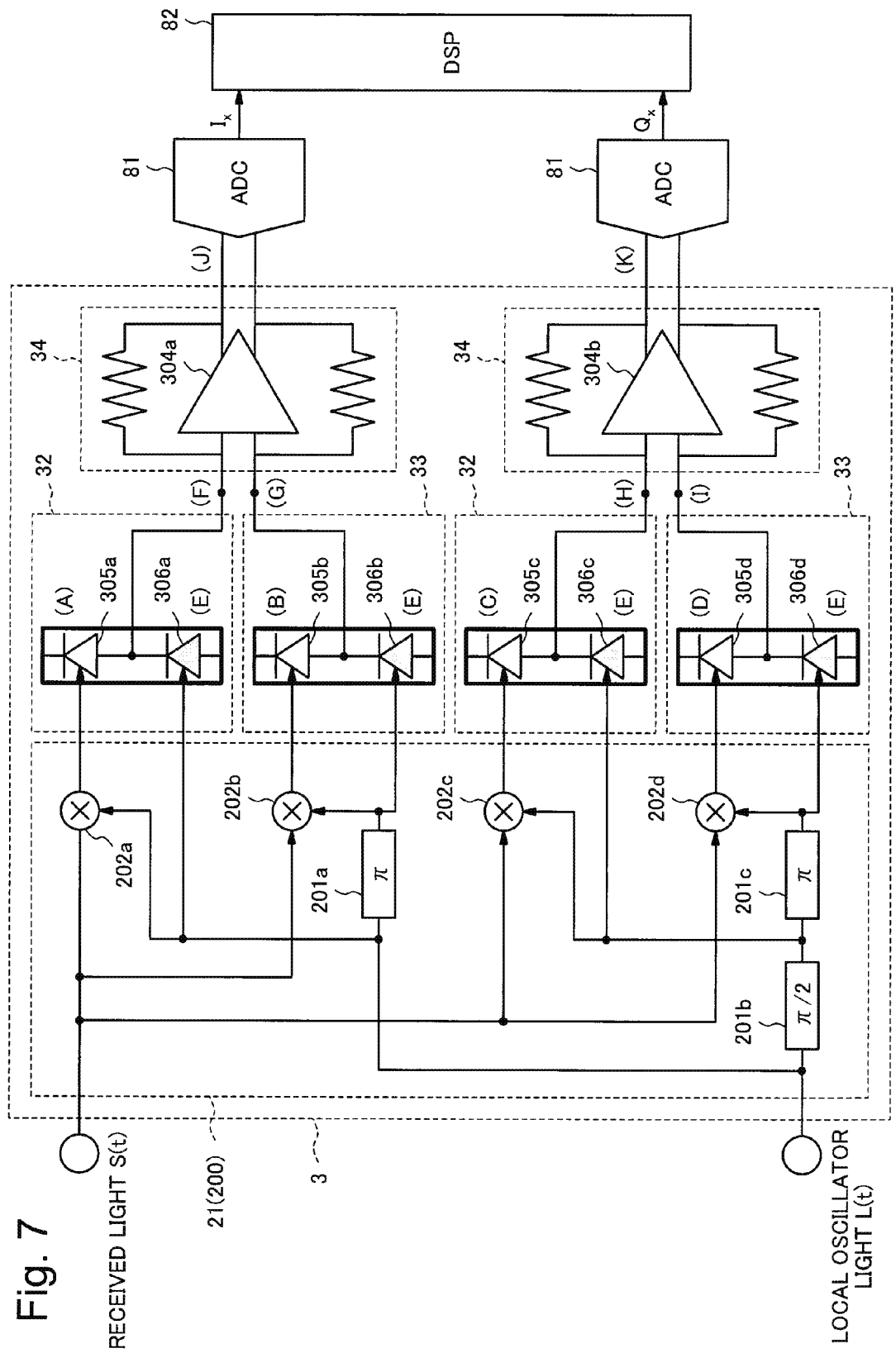

Next, another circuit configuration of the optical receiver 3 of the third exemplary embodiment of the present invention will be described. In this case, as shown in FIG. 7, the optical receiver 3 of the third exemplary embodiment of the present invention is configured such that the combinations of PDs configuring the respective balanced type photodetectors are each integrated in one substrate.

With this configuration, it is possible to have a uniform property for the PDs configuring each of the photodetectors in the optical receiver of the third exemplary embodiment of the present invention. Additionally, this configuration allows for simplification of an assembly process of the optical receiver.

Further, in each of the balanced type photodetectors configuring the first and the second interference light subtraction units in the third exemplary embodiment of the present invention, the PDs 306a to 306d for photoelectric conversion of the local oscillator light proportional signals may be configured by PDs with a smaller capacitance than that of the PDs 305a to 305d for photoelectric conversion of the first and the second interference light signals. That is, the PDs 306a to 306d may be configured by PDs with thicker optical absorption layer and longer carrier transit time but a smaller capacitance compared to the PDs 305a to 305d. Here, because the PDs 306a to 306d to which the local oscillator light proportional signals are inputted are configured for subtracting offset components, the PDs 306a to 306d are not required to have a large bandwidth. Accordingly, by configuring the PDs 306a to 306d by the use of PDs with thick optical absorption layer and a small capacitance, increase in the input capacitance for the differential type transimpedance amplifiers 304a and 304b can be suppressed.

In the second and the third exemplary embodiments of the present invention, descriptions have been given of the examples of circuit configurations of optical receivers which perform coherent reception of a QPSK optical signal. The optical receivers of the present invention are also applicable as an optical receiver in a reception device for receiving another type of phase shift keying optical signal.

In each of the exemplary embodiments of the present invention, the local oscillator light proportional signals have been described to be ones inputted from the outside or ones whose intensities are adjusted by the interference unit. The optical receivers of the present invention may include a light attenuation unit which outputs a local oscillator light proportional signal obtained by attenuating the local oscillator light to adjust its intensity. Such a light attenuation unit is configured by, for example, an optical attenuator. In this case, the light attenuation unit is arranged between the interference unit and the first and second interference light subtraction units. Alternatively, the light attenuation unit may be arranged in the optical 90 degree hybrid configuring the interference unit.

In each of the exemplary embodiments of the present invention, descriptions have been given of the examples where the first and the second interference light subtraction units perform photoelectric conversion of the local oscillator light proportional signals. To the first and the second interference light subtraction units of the optical receivers of the present invention, current signals with intensities based on the light intensity of the local oscillator light may be inputted from the outside. In this case, the first and the second interference light subtraction units generate, as the first and the second interference light subtraction signals, the differences between respective ones of signals resulting from photoelectric conversion of the first and the second interference light signals and respective ones of the current signals inputted from the outside.

Further, the exemplary embodiments described above may be implemented in an appropriate combination with each other.

Although the present invention has been described above with reference to the exemplary embodiments, the present invention is not limited to the above-described exemplary embodiments. Various changes and modifications understood by those skilled in the art may be made to the configurations and details of the present invention, within the scope of the present invention.

This application is based upon and claims the benefit of priority from Japanese Patent Application No. 2011-043742, filed on Mar. 1, 2011, the disclosure of which is incorporated herein in its entirety by reference.

Reference Signs List
1, 2, 3, 90 optical receiver
9 reception device
11, 21 interference unit
12, 32 first interference light subtraction unit
13, 33 second interference light subtraction unit
14, 34, 93 difference output unit
81 AD conversion unit
82, 95 digital signal processing unit
91, 200 optical 90 degree hybrid
92 PD
94 AD converter
201a to 201c optical phase shifter
202a to 202d optical mixer
203a to 203d, 204a to 204b subtractor
205a to 205d, 206a to 206d, 305a to 305d, 306a to 306d PD
304a to 304b differential type transimpedance amplifier

The invention claimed is:

1. An optical receiver comprising:
an interference unit which generates a first interference light signal and a second interference light signal with an approximately inverse phase to that of the first interference light signal, by causing a received light signal to interfere with local oscillator light;
a first interference light subtraction unit which generates a first interference light subtraction signal representing the difference between a signal obtained by photoelectric conversion of the first interference light signal and a signal obtained by photoelectric conversion of a light signal having a light intensity based on the light intensity of the local oscillator light;
a second interference light subtraction unit which generates a second interference light subtraction signal representing the difference between a signal obtained by photoelectric conversion of the second interference light signal and a signal obtained by photoelectric conversion of the light signal having the light intensity based on the light intensity of the local oscillator light; and
a difference output unit which outputs a signal representing the difference between the first interference light subtraction signal and the second interference light subtraction signal.

2. The optical receiver according to claim 1, wherein
the difference output unit is configured by a differential amplification unit which amplifies and subsequently outputs the signal representing the difference.

3. The optical receiver according to claim 1, wherein
the interference unit generates the light signal having the light intensity based on the light intensity of the local oscillator light by attenuating the local oscillator light to adjust intensity of the local oscillator light, and outputs the generated light signal to the first interference light subtraction unit and the second interference light subtraction unit.

4. The optical receiver according to claim 1 further comprising
an optical attenuating unit which generates the light signal having the light intensity based on the light intensity of the local oscillator light by attenuating the local oscillator light to adjust intensity of the local oscillator light, and outputs the generated light signal to the first interference light subtraction unit and the second interference light subtraction unit.

5. The optical receiver according to claim 1, wherein,
in at least one of the first interference light subtraction unit and the second interference light subtraction unit, the capacitance of a photodetection unit for performing photoelectric conversion of the light signal having the light intensity based on the light intensity of the local oscillator light is smaller than the capacitance of a photodetection unit for performing photoelectric conversion of either the first or second interference light signals.

6. The optical receiver according to claim 1, wherein
the light intensity of the light signal having the light intensity based on the light intensity of the local oscillator light is smaller than the light intensity of the local oscillator light.

7. The optical receiver according to claim 1, wherein
at least one of the first interference light subtraction unit and the second interference light subtraction unit is formed in a single substrate.

8. An optical reception method comprising:
generating a first interference light signal and a second interference light signal with an approximately inverse phase to that of the first interference light signal, by causing a received light signal to interfere with local oscillator light;
generating a first interference light subtraction signal representing the difference between a signal obtained by photoelectric conversion of the first interference light signal and a signal obtained by photoelectric conversion of a light signal having a light intensity based on the light intensity of the local oscillator light;
generating a second interference light subtraction signal representing the difference between a signal obtained by photoelectric conversion of the second interference light signal and a signal obtained by photoelectric conversion of the light signal having the light intensity based on the light intensity of the local oscillator light; and outputting a signal representing the difference between the first interference light subtraction signal and the second interference light subtraction signal.

9. The optical reception method according to claim 8, wherein the light signal having a light intensity based on the light intensity of the local oscillator light is generated by attenuating the local oscillator light to adjust its intensity.

10. An optical receiver comprising:

an interference unit which generates a first interference light signal and a second interference light signal with an approximately inverse phase to that of the first interference light signal, by causing a received light signal to interfere with local oscillator light;

a first interference light subtraction unit which generates a first interference light subtraction signal representing the difference between a signal obtained by photoelectric conversion of the first interference light signal and an electrical signal having an intensity based on the light intensity of the local oscillator light;

a second interference light subtraction unit which generates a second interference light subtraction signal representing the difference between a signal obtained by photoelectric conversion of the second interference light signal and the electrical signal having the intensity based on the light intensity of the local oscillator light; and a difference output unit which outputs a signal representing the difference between the first interference light subtraction signal and the second interference light subtraction signal.

11. The optical receiver according to claim 2, wherein
the interference unit generates the light signal having the light intensity based on the light intensity of the local oscillator light by attenuating the local oscillator light to adjust intensity of the local oscillator light, and outputs the generated light signal to the first interference light subtraction unit and the second interference light subtraction unit.

12. The optical receiver according to claim 2 further comprising an optical attenuating unit which generates the light signal having the light intensity based on the light intensity of the local oscillator light by attenuating the local oscillator light to adjust intensity of the local oscillator light, and outputs the generated light signal to the first interference light subtraction unit and the second interference light subtraction unit.

13. The optical receiver according to claim 2, wherein,
in at least one of the first interference light subtraction unit and the second interference light subtraction unit, the capacitance of a photodetection unit for performing photoelectric conversion of the light signal having the light intensity based on the light intensity of the local oscillator light is smaller than the capacitance of a photodetection unit for performing photoelectric conversion of either the first or second interference light signals.

14. The optical receiver according to claim 3, wherein,
in at least one of the first interference light subtraction unit and the second interference light subtraction unit, the capacitance of a photodetection unit for performing photoelectric conversion of the light signal having the light intensity based on the light intensity of the local oscillator light is smaller than the capacitance of a photodetection unit for performing photoelectric conversion of either the first or second interference light signals.

15. The optical receiver according to claim 4, wherein,
in at least one of the first interference light subtraction unit and the second interference light subtraction unit, the capacitance of a photodetection unit for performing photoelectric conversion of the light signal having the light intensity based on the light intensity of the local oscillator light is smaller than the capacitance of a photodetection unit for performing photoelectric conversion of either the first or second interference light signals.

16. The optical receiver according to claim 2, wherein
the light intensity of the light signal having the light intensity based on the light intensity of the local oscillator light is smaller than the light intensity of the local oscillator light.

17. The optical receiver according to claim 3, wherein
the light intensity of the light signal having the light intensity based on the light intensity of the local oscillator light is smaller than the light intensity of the local oscillator light.

18. The optical receiver according to claim 4, wherein
the light intensity of the light signal having the light intensity based on the light intensity of the local oscillator light is smaller than the light intensity of the local oscillator light.

19. The optical receiver according to claim 5, wherein
the light intensity of the light signal having the light intensity based on the light intensity of the local oscillator light is smaller than the light intensity of the local oscillator light.

20. The optical receiver according to claim 2, wherein
at least one of the first interference light subtraction unit and the second interference light subtraction unit is formed in a single substrate.

* * * * *